(12) United States Patent
Watanabe et al.

(10) Patent No.: US 12,420,455 B2
(45) Date of Patent: Sep. 23, 2025

(54) MOLD DEVICE

(71) Applicant: TOYOTA JIDOSHA KABUSHIKI KAISHA, Toyota (JP)

(72) Inventors: Hirotsune Watanabe, Toyota (JP); So Nakayama, Toyota (JP); Akinobu Kawai, Toyota (JP); Hiroyuki Hamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 18/158,819

(22) Filed: Jan. 24, 2023

(65) Prior Publication Data
US 2023/0271351 A1 Aug. 31, 2023

(30) Foreign Application Priority Data
Feb. 28, 2022 (JP) ................ 2022-029489

(51) Int. Cl.
*B29C 33/30* (2006.01)
*B29C 33/24* (2006.01)
*B29C 45/17* (2006.01)

(52) U.S. Cl.
CPC ............ *B29C 33/307* (2013.01); *B29C 33/24* (2013.01); *B29C 45/1742* (2013.01); *B29C 45/1761* (2013.01); *B29C 2045/1763* (2013.01); *B29C 2045/1788* (2013.01)

(58) Field of Classification Search
CPC ... B29C 33/307; B29C 45/66; B29C 45/1742; B29C 45/1761; B29C 33/24; B29C 2045/1763; B29C 2045/1788
See application file for complete search history.

(56) References Cited

U.S. PATENT DOCUMENTS 3,704,973 A   12/1972  Renfrew et al.
5,356,279 A   10/1994  Füller et al.
(Continued)

FOREIGN PATENT DOCUMENTS

EP    0 381 107 A2    8/1990
JP      47-3010 B     1/1972
(Continued)

OTHER PUBLICATIONS

Translation of Japanese Office Action issued Sep. 3, 2024 in Japanese Application No. 2022-029489.

*Primary Examiner* — Jerzi H Moreno Hernandez
(74) *Attorney, Agent, or Firm* — Sughrue Mion, PLLC

(57) ABSTRACT

A mold device includes a frame that is a vertical wall having a first surface that is a vertical surface to which a holding mechanism is mounted and supported only by the first surface. A fixed mold base supporting a fixed mold, one surface thereof fixed to the first surface of the frame, and a mobile mold base supporting a mobile mold, the mobile mold base held by the holding mechanism so that the mobile mold base moves closer to and away from the fixed mold base. The holding mechanism includes a rail fixed to the first surface, and a guide fit on the rail in such a way that the guide moves on the rail while the guide is fixed to the mobile mold base. The mobile mold base is supported by the holding means without using a tie bar, and cantilevered on the first surface via the holding mechanism.

6 Claims, 5 Drawing Sheets

(56) References Cited

U.S. PATENT DOCUMENTS

| | | | | |
|---|---|---|---|---|
| 5,700,502 A | * | 12/1997 | Hehl | B29C 45/68 |
| | | | | 100/231 |
| 5,736,169 A | * | 4/1998 | Brams | B29C 45/67 |
| | | | | 425/588 |
| 2002/0020933 A1 | * | 2/2002 | Sekiguchi | B29C 45/1671 |
| | | | | 425/135 |
| 2003/0150586 A1 | | 8/2003 | Matsuura et al. | |
| 2007/0218161 A1 | * | 9/2007 | Nagano | B29C 45/062 |
| | | | | 425/451.9 |
| 2019/0151939 A1 | * | 5/2019 | Benck | B22D 17/32 |
| 2024/0198567 A1 | * | 6/2024 | Svoboda | B29C 45/1775 |

FOREIGN PATENT DOCUMENTS

| | | | |
|---|---|---|---|
| JP | 57-53321 U | 9/1980 | |
| JP | 3-38313 A | 2/1991 | |
| JP | 2610197 B2 | 5/1997 | |
| JP | 10-217302 A | 8/1998 | |
| JP | 2000-254765 A | 9/2000 | |
| JP | 4323900 B2 | 6/2009 | |
| JP | 2010089295 A * | 4/2010 | B29C 45/17 |

\* cited by examiner

MOLD DEVICE

CROSS REFERENCE TO RELATED APPLICATIONS

This application is based upon and claims the benefit of priority from Japanese patent application No. 2022-029489, filed on Feb. 28, 2022, the disclosure of which is incorporated herein in its entirety by reference.

BACKGROUND

The present disclosure relates to a mold device, for example, a mold device including a mold for molding a sand mold.

For example, Japanese Patent No. 2610197 discloses a technique related to a mold device. Since a mold used for a mold device is heavy, the mold device holds a movable platen that supports a mobile mold with a structure such as a tie bar as shown in FIG. 1 of Japanese Patent No. 2610197.

SUMMARY

However, when the mobile mold is held by the tie bar, a frame for the structure to support the tie bar becomes large, which creates a problem of increasing restrictions on the installation.

The present disclosure has been made in order to solve such a problem, and an object thereof is to reduce the restrictions on the installation of a mold device.

In an example aspect of the present disclosure, a mold device includes: a fixed mold base for supporting a fixed mold; a mobile mold base for supporting a mobile mold; a frame to which the fixed mold base is fixed, provided to extend in a direction in which the mobile mold base is moved, and formed into a wall shape; and holding means for movably supporting the mobile mold base to the frame. The frame is provided along at least one side of the mobile mold base except an upper surface thereof with the mold device installed, and the holding means supports the mobile mold base at one side of the mobile mold base.

In the mold device according to the present disclosure, the mobile mold base is cantilevered and supported.

According to the mold device of the present disclosure, it is possible to reduce the restrictions on the installation of a mold device.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
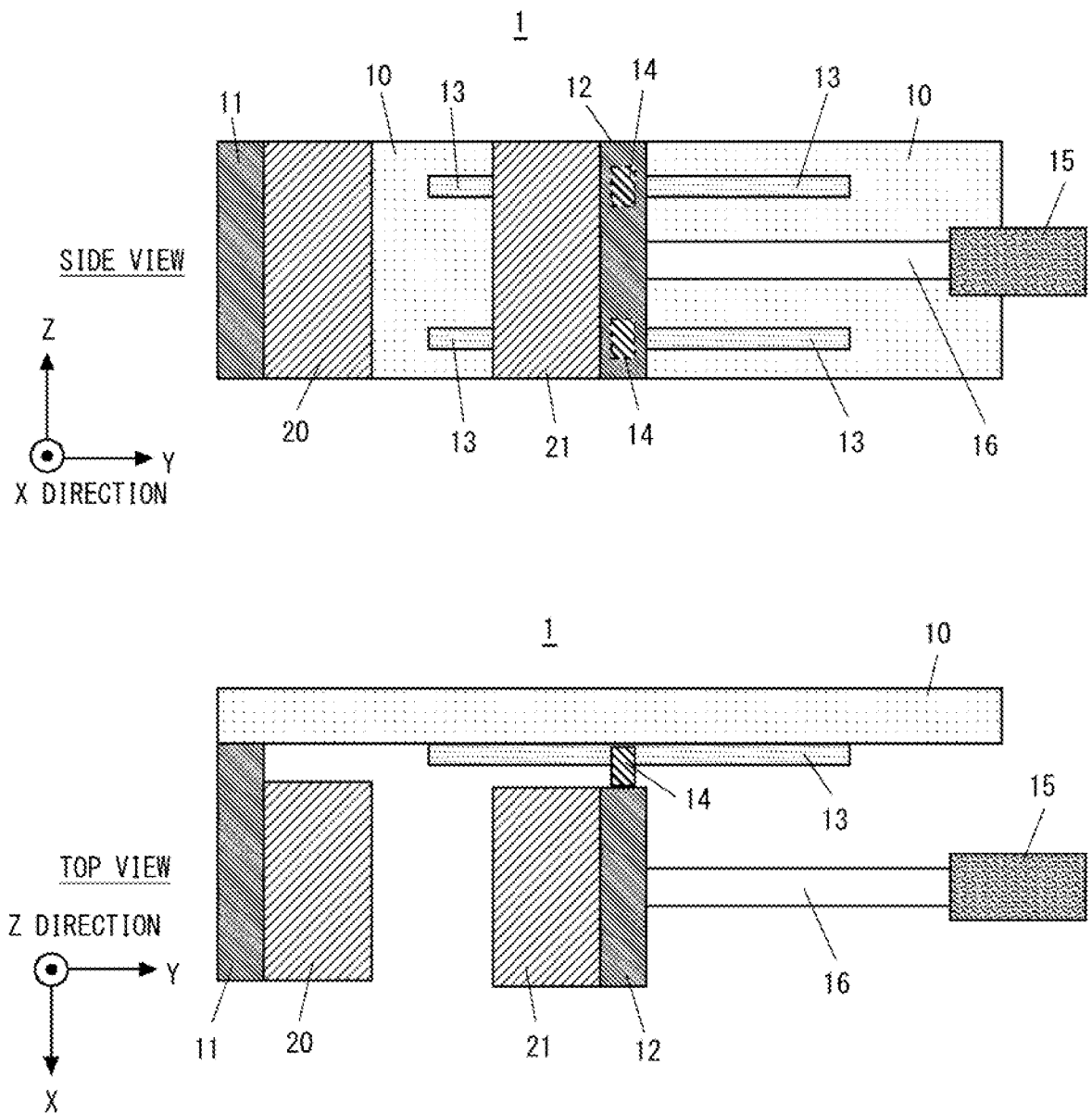
FIG. 1 is an overview diagram of a mold device according to a first embodiment.

First, FIG. 1 is an overview diagram of a mold device 1 according to a first embodiment. In FIG. 1, a side view of a device viewed from the side when the mold device 1 is installed is shown in the upper part of the drawing, and a top view of the device viewed from the top is shown in the lower part thereof.

As shown in FIG. 1, the mold device 1 according to the first embodiment includes a frame 10, a fixed mold base 11, a mobile mold base 12, holding means (e.g., rails 13 and guides 14), and driving means (a cylinder 15 and a plunger 16). The mold device 1 further includes a fixed mold 20 and a mobile mold 21. The fixed mold 20 is supported by the fixed mold base 11. The mobile mold 21 is supported by the mobile mold base 12. The fixed mold 20 and the mobile mold 21 are replaced by a molded product to be manufactured.

The frame 10 is connected so that the fixed mold base 11 is fixed and the mobile mold base 12 is movable. The frame 10 is then formed into a wall shape extending in a direction in which the mobile mold base 12 is moved. The fixed mold base 11 supports the fixed mold 20. The mobile mold base 12 supports the mobile mold 21.

In the example shown in FIG. 1, support means (i.e., holding means) movably supports the mobile mold base 12 to the frame 10. In the example shown in FIG. 1, a combination of the rails 13 and the guides 14 is used as the holding means. The rails 13 are fixed to the frame 10. The guides 14 are fitted into the rails so as to be movable on the rail and fixed to the mobile mold base 12.

In the example shown in FIG. 1, the driving means employs a combination of the cylinder 15 and the plunger 16. The plunger 16 is connected to a central part of the mobile mold base 12. The cylinder 15 moves the mobile mold base 12 laterally (e.g., in a Y direction) in FIG. 1 by sliding the plunger 16 in directions in which the plunger 16 is extruded and extruded back.

Here, in the mold device 1 according to the first embodiment, the frame 10 is provided along at least one side of the molding device 1 except an upper surface of the mobile mold base 12 with the mold device installed, and the holding means supports the mobile mold base on a surface along one side of the mobile mold base 12. In the example shown in FIG. 1, the frame 10 is provided so as to be opposite to, among the surfaces of the mobile mold base 12, a surface facing in the horizontal direction. That is, the mobile mold base 12 is cantilevered and supported in the mold device 1 according to the first embodiment shown in FIG. 1. The mold device 1 according to the first embodiment is specifically configured so that no other structure covers an area where the fixed mold 20 and the mobile mold 21 are brought into contact with each other.

In the mold device 1 according to the first embodiment, mold sand is charged into a mold formed by the fixed mold 20 and the mobile mold 21 from an upper side of the device (e.g., from a Z direction). Therefore, a part of the upper surface of the mold device 1 where the fixed mold 20 is brought into contact with the mobile mold 21 must be exposed.

In the example shown in FIG. 1, the frame 10, the fixed mold base 11, the mobile mold base 12, the guides 14, the cylinder 15, and the plunger 16 are shown exposed, but they may have a cover. In this case, the cover is provided with an opening around the area where the fixed mold 20 and the mobile mold 21 are brought into contact with each other.

As shown in FIG. 1, in the mold device 1 according to the first embodiment, the guides 14 and the rails 13 are used as the holding means for the mobile mold base 12, so that the structure to support the holding means itself, such as the tie bar, is not required and a total volume of the device can be reduced.

Therefore, even if each of the two opposing sides of the mobile mold base 12 is supported by the rail 13 and the guide 14, it is possible to reduce the total volume of the mold device 1 according to the first embodiment, because a structure to support the holding means itself, such as a tie bar, is unnecessary. However, the effect of the reduction in the total volume of the mold device 1 according to the first embodiment is smaller than that of the mold device 1 with the cantilever support structure shown in FIG. 1.

In the example shown in FIG. 1, the rails 13 and guides 14 are shown as the holding means. Alternatively, the rails can be replaced with ball screws and actuators for rotating the ball screws may be added. If ball screws are used, screw holes must be provided in the mobile mold base 12 to engage the ball screws. Thus, even when a combination of ball screws and actuators is used, the total volume of the mold device 1 can be reduced, because the structure for supporting the ball screws can be very simple.

In addition, in the mold device 1 according to the first embodiment, the holding means is fixed only to the frame 10 and there are no restrictions on other parts, so that the degree of freedom of installation of control equipment and the like associated with the mold device 1 can be increased.

Second Embodiment

In a second embodiment, another form of the mold device 1 according to the first embodiment will be described. In the description of the second embodiment, the same components as those described in the first embodiment are assigned the same signs as those in the first embodiment, and the description thereof is omitted.

Figure 2:
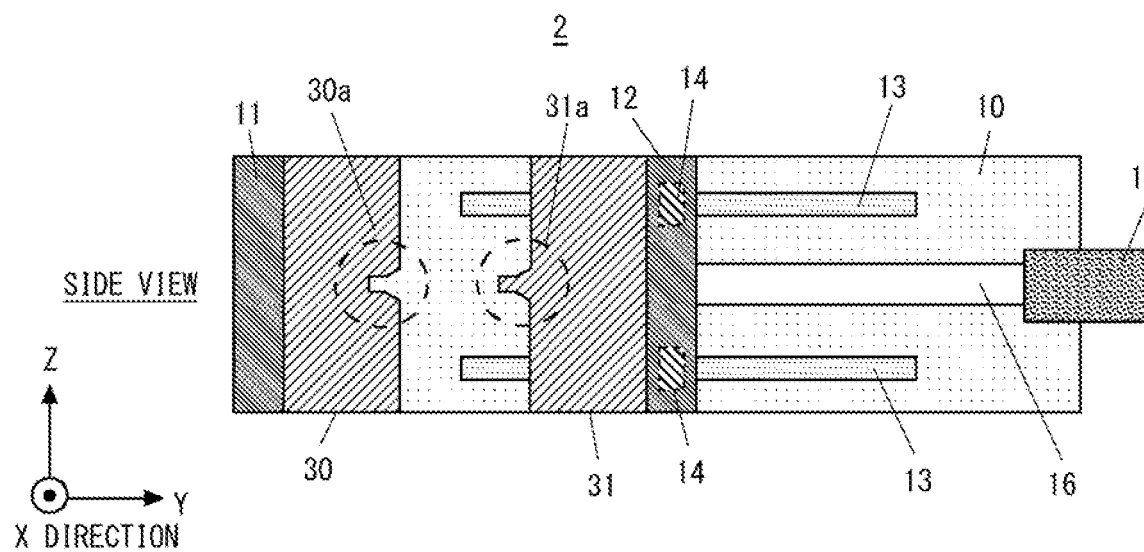
FIG. 2 is an overview diagram of a mold device according to a second embodiment.
Figure 2:
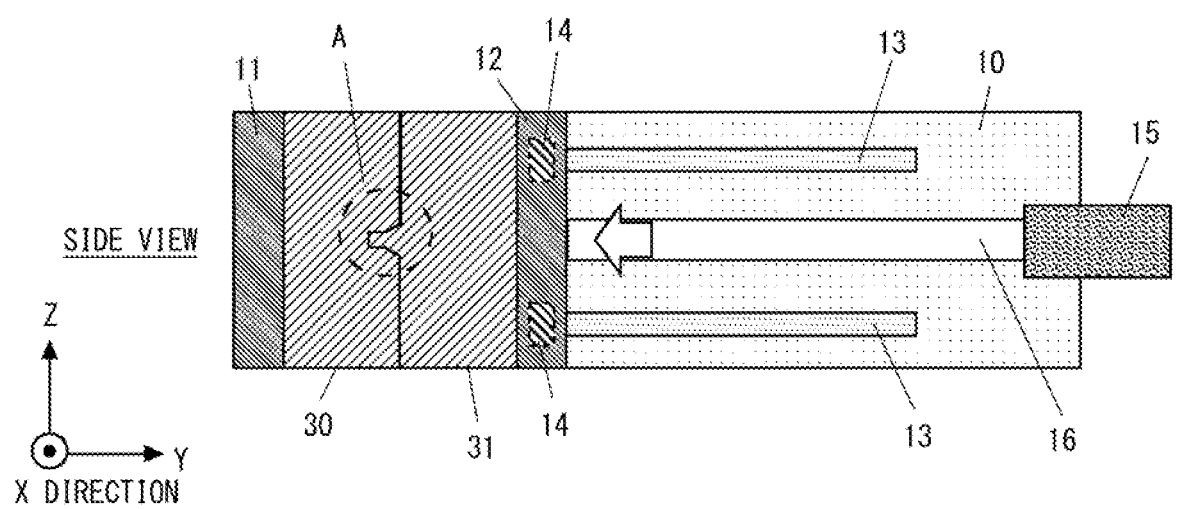

FIG. 2 is an overview diagram of a mold device 2 according to the second embodiment. As shown in FIG. 2, the mold device 2 according to the second embodiment includes a fixed mold 30 and a mobile mold 31 instead of the fixed mold 20 and the mobile mold 21. The fixed mold 30 is the fixed mold 20 further including a fixed mold positioning key 30a. The mobile mold 31 is the mobile mold 21 further including a mobile mold positioning key 31a. The fixed mold positioning key 30a and the mobile mold positioning key 31a are a recess and a projection, respectively, that fit to each other when the fixed mold 30 and the mobile mold 31 are put together, as shown in an area A of the lower drawing of FIG. 2. In another aspect, one pair of a recessed positioning key and a projected positioning key is formed in the fixed mold 20, and another pair of a recessed positioning key and a projected positioning key is formed in the mobile mold 21.

These positioning keys are provided on one or more surfaces including at least the surface opposite to the surface on which the holding means (e.g., guides 14) is provided. In the example shown in FIG. 2, the movable positioning key 31a is provided on the surface of the mobile mold base 12 opposite to the surface where the guide 14 is provided among the surfaces of the mobile mold base 12. The fixed positioning key 30a is provided on the surface corresponding to the surface where the mobile mold positioning key 31a is provided among the surfaces of the fixed mold 30.

By providing the positioning keys in this way, it becomes easy to position the fixed mold base 30 and the mobile mold base 31 when the fixed mold base 30 and the mobile mold base 31 are attached to the fixed mold base 11 and the mobile mold base 12, respectively. In addition, by forming the positioning keys on the side of the fixed mold 30 where the guides 14 are provided, positioning accuracy can be further improved than in the example shown in FIG. 2.

The positioning keys are preferably provided near the center of the side where the guides 14 are to be provided. By providing positioning keys near a center of the side, it is possible to reduce the displacement of key positions due to thermal expansion of the mold.

Third Embodiment

In a third embodiment, another form of the mold device 1 according to the first embodiment will be described. In the description of the third embodiment, the same components as those described in the first embodiment are assigned the same symbols as those in the first embodiment, and the description thereof is omitted.

Figure 3:
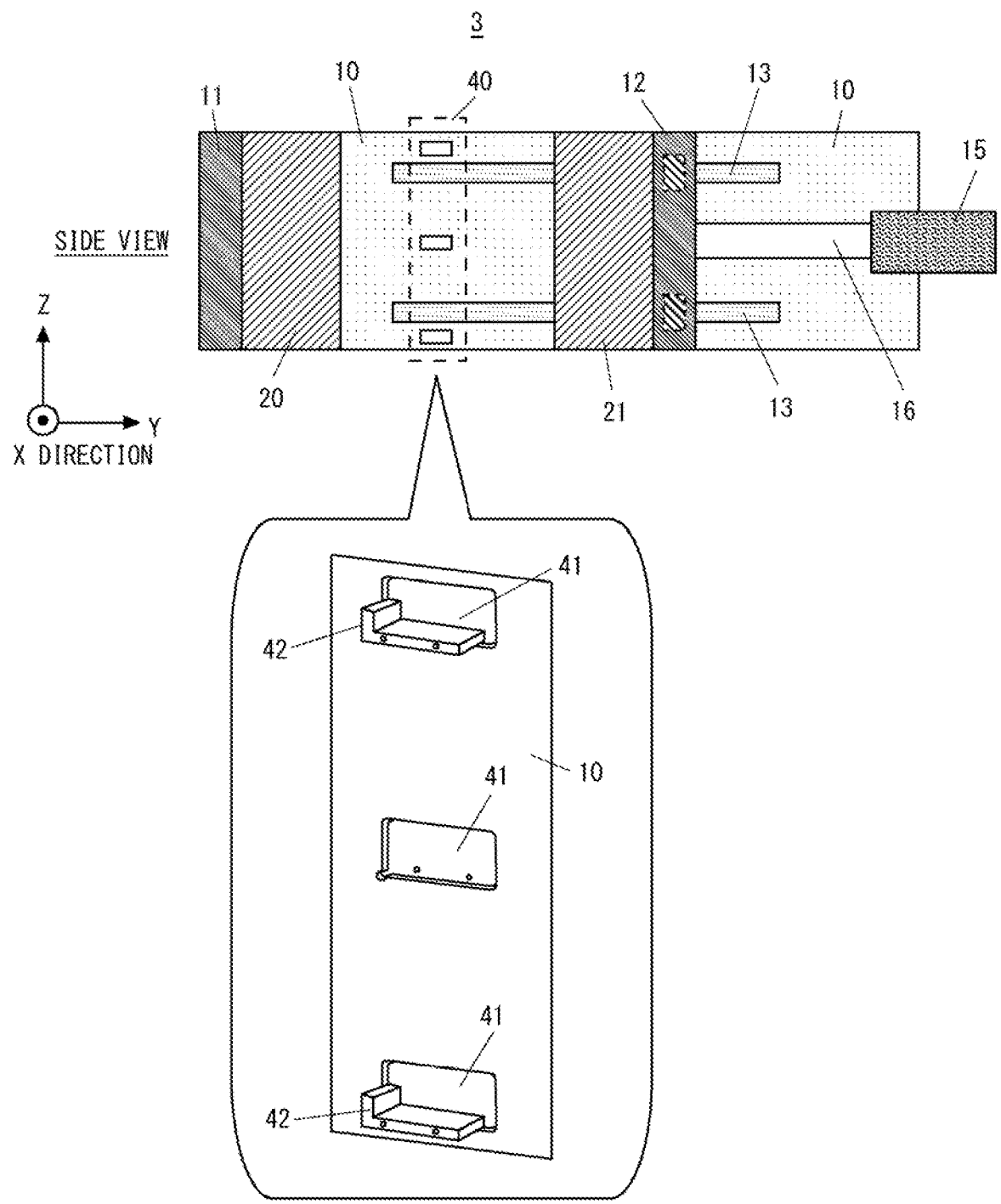
FIG. 3 is an overview diagram of a mold device according to a third embodiment.

FIG. 3 is an overview diagram of a mold device 3 according to the third embodiment. As shown in FIG. 3, the mold device 3 according to the third embodiment includes a scale guide 40 on the frame 10. FIG. 3 shows an enlarged view of the scale guide 40. As shown in FIG. 3, the scale guide 40 includes at least one machined surface 41 formed with a preset degree of verticality and flatness. A guide jig 42 can be attached to the machined surface 41. The guide jig 42 may be attached at the time of an inspection described later or may be installed regularly.

Figure 4:
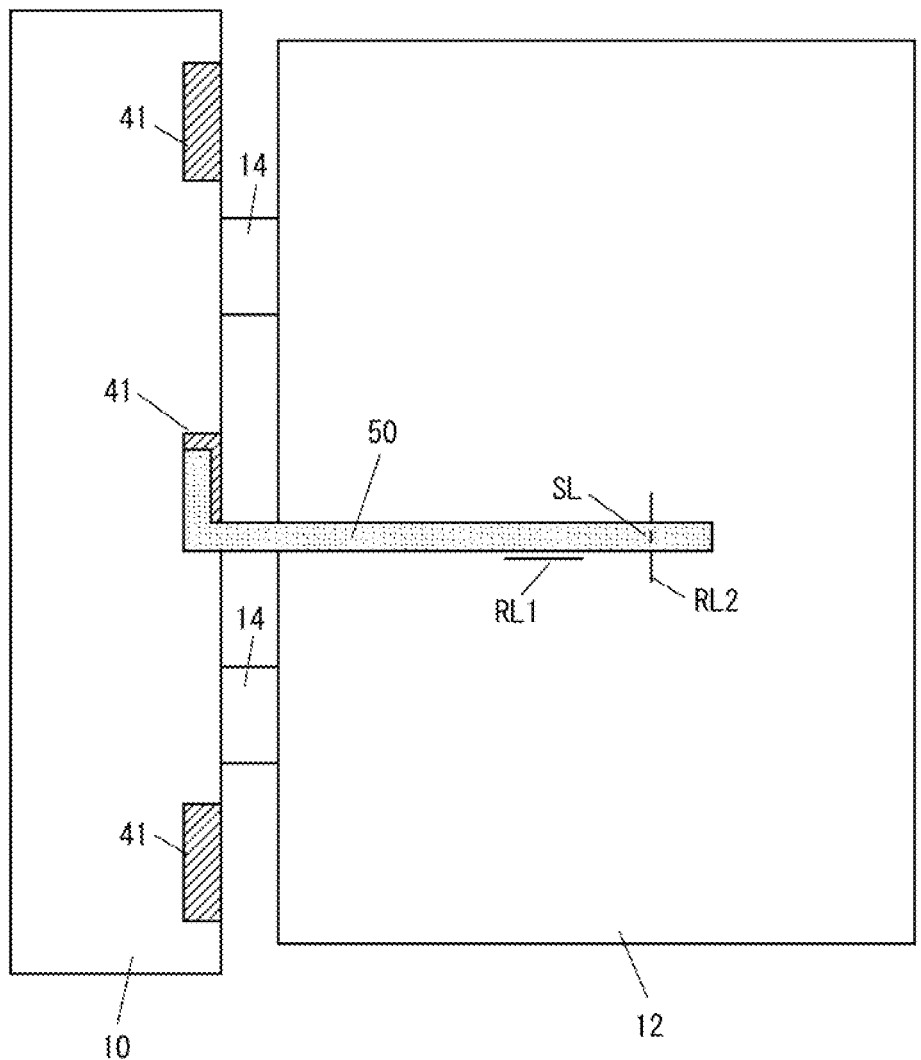
FIG. 4 is a diagram for explaining a procedure of an inspection on the mold device according to the third embodiment.

Here, an inspection using the scale guide 40 is described. FIG. 4 is a diagram for explaining a procedure of the inspection on the mold device 3 according to the third embodiment. As shown in FIG. 4, at the time of an inspection, a scale 50 is applied to the frame 10 along the machined surface 41. The mobile mold base 12 is provided with dimensional reference lines RL1 and RL2 formed at positions relative to the machined surface 41. The base-side reference line RL1 is, for example, a line provided to intersect vertically with the machined surface 41. The base-side reference line RL2 is, for example, a line parallel to the machined surface 41 at a certain distance from the machined surface 41. The scale 50 is provided with a scale-side reference line SL at a position matching the base-side reference line RL2. Next, the scale 50 is applied to the machined surface 41 to check whether or not the base-side reference line RL1 is parallel to the side of the scale 50 and whether or not the base-side reference line RL1 overlaps the scale-side reference line SL, so as to check whether or not the mobile mold base 12 is inclined from a reference position. Although the machined surface 41 is not shown in FIG. 4, by using the machined surface 41, it is easy to apply the scale 50 at defined inclination and position.

In this way, by using the scale guide 40, the inclination of the mobile mold base 12 can be easily checked in the mold device 3 according to the third embodiment. In the mold device 3 having the cantilevered structure, the mobile mold base 12 tends to be inclined due to aging deterioration. By making it easy to check this inclination, processing for maintaining the mold device 3 can be simplified.

Fourth Embodiment

In a fourth embodiment, another form of the mold device 1 according to the first embodiment will be described. In the description of the fourth embodiment, the same components as those described in the first embodiment are assigned the same symbols as those in the first embodiment, and the description thereof is omitted.

Figure 5:
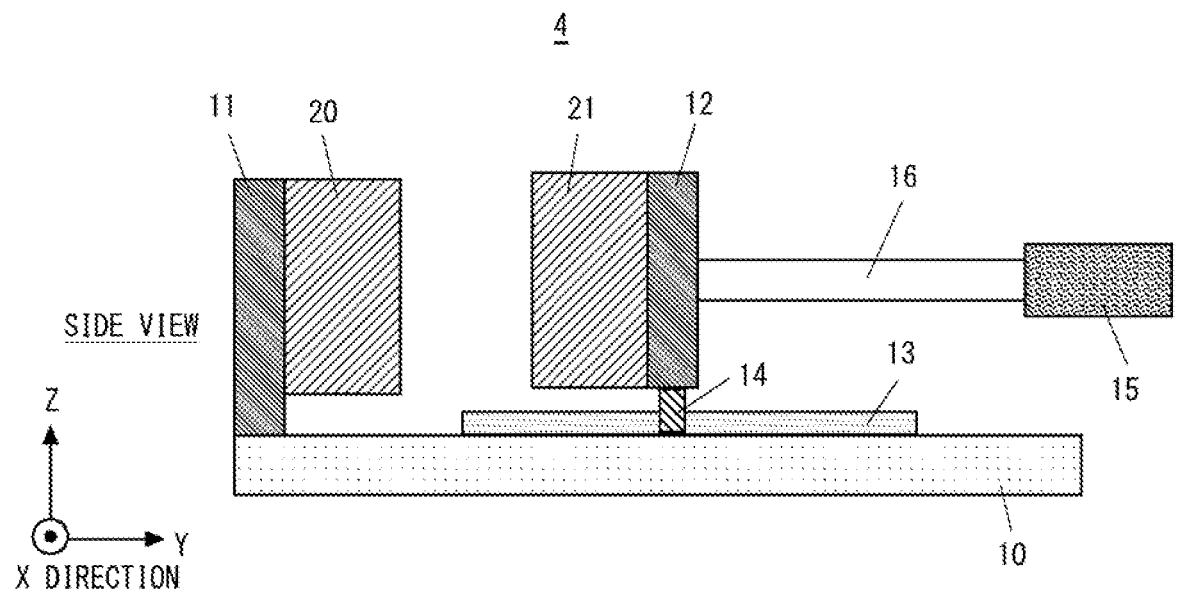
FIG. 5 is an overview diagram of a mold device according to a fourth embodiment.
Figure 5:
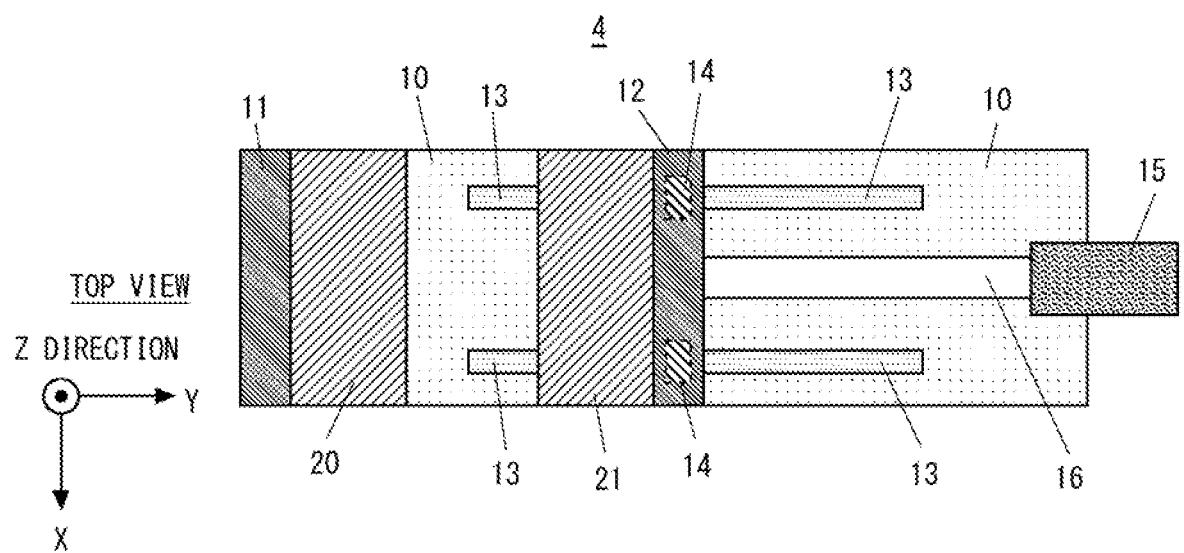

FIG. 5 is an overview diagram of a mold device according to a fourth embodiment. As shown in FIG. 5, in the fourth embodiment, the frame 10 is provided below the fixed mold base 11 and the mobile mold base 12. In this way, the frame 10 can also be provided below the fixed mold base 11 and the mobile mold base 12 rather than on the side of the fixed mold base 11 and the mobile mold base 12. By installing the frame 10 in this way, it is possible to reduce the width of the device in a depth direction (X direction in FIG. 5). By reducing the size of the device in the depth direction in this way, the footprint area at the time of the installation of the device can be reduced.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A mold device comprising:
   a frame that is a vertical wall having a first surface that is a vertical surface of the frame;
   a holding means mounted to, and supported only by, the first surface of the frame;
   a fixed mold base for supporting a fixed mold, one surface of the fixed mold base being fixed to the first surface of the frame; and
   a mobile mold base for supporting a mobile mold, the mobile mold base being held by the holding means so that the mobile mold base moves closer to and away from the fixed mold base;
   wherein
   the holding means comprises a rail fixed to the first surface of the frame, and a guide fit on the rail in such a way that the guide moves on the rail while the guide is fixed to the mobile mold base,
   the mobile mold base is supported by the holding means without using a tie bar, and
   the mobile mold base is cantilevered on the first surface of the frame via the holding means.

2. The mold device according to claim 1, wherein
   the fixed mold and the mobile mold includes a positioning key, the positioning key being a pair of a positioning recess and a positioning projection, one of the positioning recess and the positioning projection being formed in the fixed mold and another one of the positioning recess and the positioning projection being formed in the mobile mold.

3. The mold device according to claim 2, wherein
   the one of the positioning recess and the positioning projection is formed in a surface of the fixed mold that is opposite from a surface of the fixed mold that is supported by fixed mold base, and the another one of the positioning recess and the positioning projection is formed in a surface of the mobile mold that opposite from a surface of the mobile mold that is supported by the mobile mold base.

4. The mold device according to claim 1, wherein
   a machined surface is formed in the first surface of the frame, and
   the mobile mold base is provided with a dimensional reference line formed at a position relative to the machined surface.

5. The mold device according to claim 1, further comprising:
   driving means for moving the mobile mold base, wherein
   the driving means moves the mobile mold base by pressing a center of the mobile mold base.

6. The mold device according to claim 1, wherein
   the frame is disposed on a side surface of the mobile mold base in the horizontal direction.

\* \* \* \* \*